A. HECKMAN.
Corn-Planter.
No. 208,015. Patented Sept. 17, 1878.
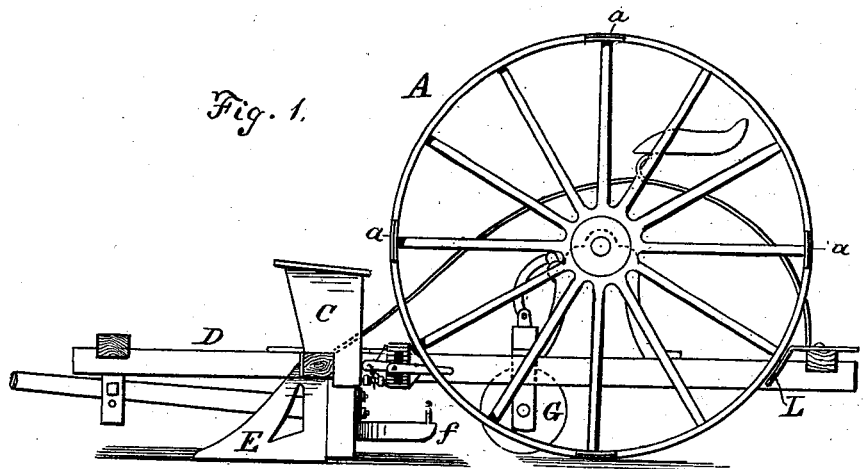
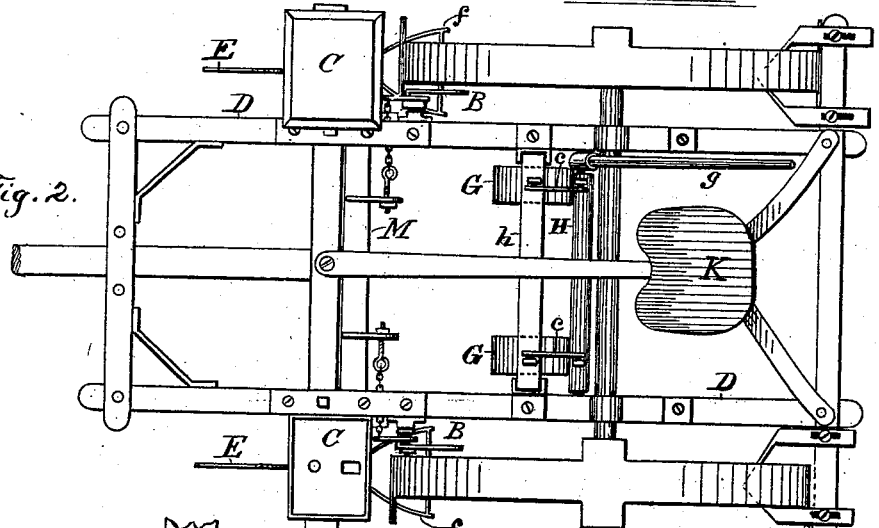
Witnesses
G. B. Towle
Id. A. Daniels
Inventor:
Adam Heckman
By W. Burris Att'y

UNITED STATES PATENT OFFICE.

ADAM HECKMAN, OF STERLING, ILLINOIS.

IMPROVEMENT IN CORN-PLANTERS.

Specification forming part of Letters Patent No. 208,015, dated September 17, 1878; application filed August 2, 1878.

*To all whom it may concern:*

Be it known that I, ADAM HECKMAN, of Sterling, in the county of Whiteside and State of Illinois, have invented certain new and useful Improvements in Corn-Planters; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to corn-planters having large carrying-wheels; and it consists of improvements in the construction of the machine, as hereinafter described.

In the accompanying drawing, forming a part of this specification, Figure 1 is a side elevation of the improved corn-planter. Fig. 2 is a plan view of the same. Fig. 3 is a detached view, in plan, of one of the hoppers and part of the dropping mechanism. Fig. 4 is a back view of hopper and other details.

Referring to the drawing, the carrying-wheels A are made larger than usual, for the reason that they are not affected by the unevenness of the ground as much as smaller wheels, and require less draft to run them. These wheels are provided with lugs $a$, for marking the cross-rows and for operating the levers connected with the dropping devices, similar to the wheels and devices shown and described in my patent granted April 30, 1878, No. 203,149.

The levers B, for operating the dropping devices in the hoppers C, are secured to the frame D, so as to be adjusted higher or lower, as may be required, for dropping the grains directly opposite the lugs $a$, this vertical adjustment of levers B being rendered necessary by the various condition of the soil when plowed, the soil being much softer sometimes than at other times.

The runners E have the arms $f$ extending backward and spreading laterally, so as to remove the clods and other rubbish from the furrows before the wheels.

The machine is provided with small wheels G, adjusted to be raised and lowered by means of a lever, $g$, attached to a rocking bar or shaft, H, which shaft is connected by pivoted arms $c$ with a cross-bar, $h$, to which are attached the standards holding the wheels G. These standards are adjusted vertically to slide up and down in guides attached to the frame of the machine.

The planter is also provided with the usual seat K for the driver, and with scrapers L in rear of the wheels A for keeping them clean.

The grain-boxes C, the sliding feed-bar M, and the other devices for dropping the grain are substantially the same as shown and described in my patent above mentioned, and the machine is operated substantially in the same manner described in that patent of April 30, 1878.

In my invention described herein the levers for operating the dropping devices are made different from those described in the former patent. The devices therein shown have but one lever on each side, pivoted at or near the middle.

In this machine there are two levers on each side, one extending forward and connected to the chains, which are fastened to the sliding feed-bar; and the other lever is provided with a lug, $d$, (see Fig. 3,) to catch under the forward lever to hold the rear lever, which extends backward in position to receive the inner lugs on the wheels. These rearward levers are constructed and adjusted to be turned up and forward out of the way of the lugs of the wheels when the dropping devices are not required to be in operation.

What I claim as new, and desire to secure by Letters Patent, is—

1. The double levers B, adjustable vertically, for operating the dropping devices, substantially as described.

2. The combination of the lever $g$, rocking shaft H, arms $c$, bar $h$, and wheels G, provided with standards and guides for raising and lowering the machine, substantially as described.

In testimony that I claim the foregoing as my own invention I affix my signature in presence of two witnesses.

ADAM HECKMAN.

Witnesses:
WILLIAM W. SANBORN,
A. H. PADDOCK.